United States Patent
Matsumura

(10) Patent No.: US 8,423,793 B2
(45) Date of Patent: Apr. 16, 2013

(54) DATA PROCESSING DEVICE, DATA MANAGEMENT METHOD, STORAGE MEDIUM OF STORING COMPUTER-READABLE PROGRAM, AND PROGRAM

(75) Inventor: Takeshi Matsumura, Yokohama (JP)

(73) Assignee: Canon Kabushiki Kaisha (JP)

( * ) Notice: Subject to any disclaimer, the term of this patent is extended or adjusted under 35 U.S.C. 154(b) by 1493 days.

(21) Appl. No.: 11/238,864

(22) Filed: Sep. 29, 2005

(65) Prior Publication Data

US 2006/0069846 A1 Mar. 30, 2006

(30) Foreign Application Priority Data

Sep. 30, 2004 (JP) ................................. 2004-285994

(51) Int. Cl.
G06F 21/00 (2006.01)
(52) U.S. Cl.
USPC .................. 713/193; 713/189; 726/2; 726/26
(58) Field of Classification Search .................. 713/189,
713/193, 183; 380/243, 277, 201; 726/22,
726/30, 32, 33; 714/100, 819
See application file for complete search history.

(56) References Cited

U.S. PATENT DOCUMENTS

| | | | | |
|---|---|---|---|---|
| 5,414,721 A | * | 5/1995 | Fukui | 714/819 |
| 5,448,728 A | * | 9/1995 | Takano et al. | 1/1 |
| 6,345,270 B1 | * | 2/2002 | Tanaka | 707/4 |
| 6,687,683 B1 | * | 2/2004 | Harada et al. | 705/51 |
| 6,862,583 B1 | * | 3/2005 | Mazzagatte et al. | 705/64 |
| 7,134,016 B1 | * | 11/2006 | Harris | 713/168 |
| 7,275,161 B2 | * | 9/2007 | Ochi et al. | 713/182 |
| 7,472,287 B2 | * | 12/2008 | Lee | 713/193 |
| 2002/0073102 A1 | * | 6/2002 | Okamoto et al. | 707/200 |
| 2003/0105717 A1 | * | 6/2003 | Kim et al. | 705/50 |
| 2003/0158608 A1 | * | 8/2003 | Ishikawa et al. | 700/2 |
| 2003/0161475 A1 | * | 8/2003 | Crumly et al. | 380/280 |
| 2006/0010328 A1 | * | 1/2006 | Esaka et al. | 713/190 |

FOREIGN PATENT DOCUMENTS

JP 10-137419 A 5/1998
JP 2004-139163 A 5/2004

* cited by examiner

Primary Examiner — Taghi Arani
Assistant Examiner — Mohammad L Rahman
(74) Attorney, Agent, or Firm — Rossi, Kimms & McDowell LLP

(57) ABSTRACT

A data processing device comprises a second storage unit for storing data accessed in a first storage unit, and compares data read from the first storage unit with the data stored in the second storage unit. Thus, the data processing device judges whether or not the first storage unit is a predetermined device.

7 Claims, 11 Drawing Sheets

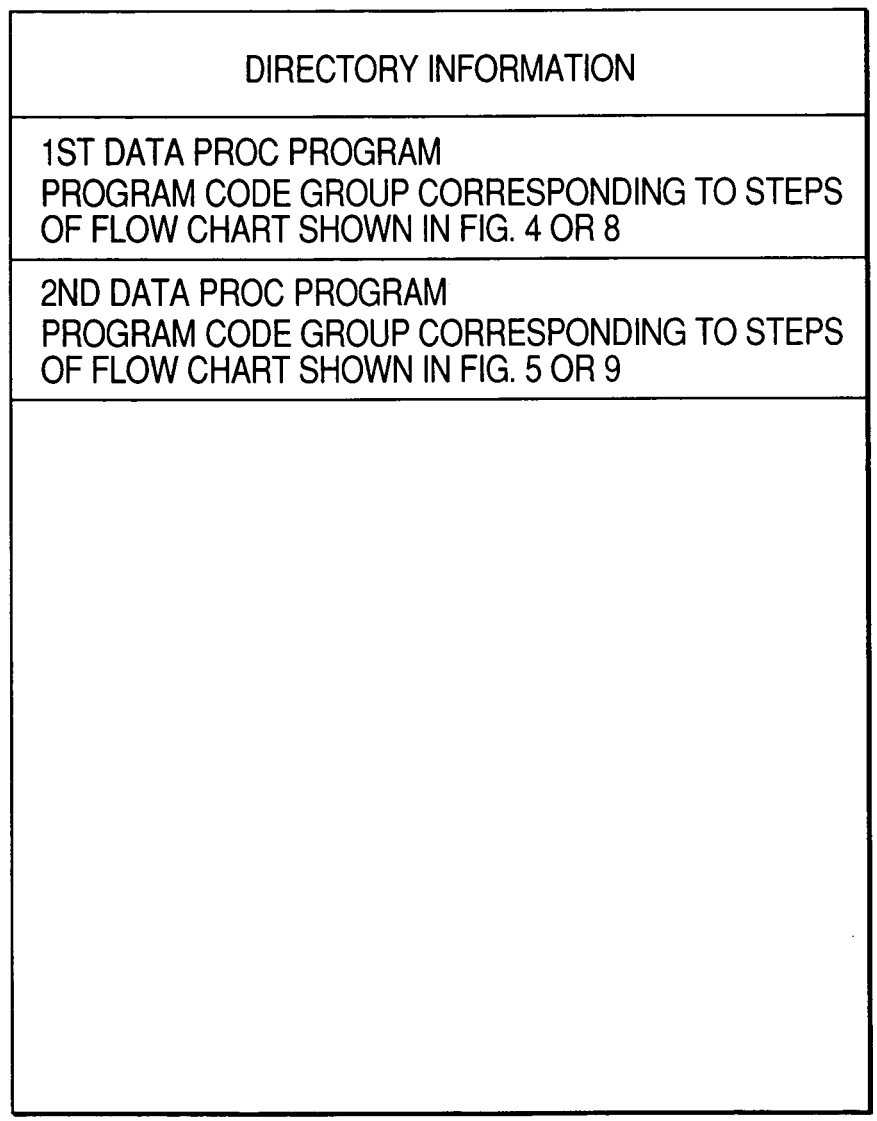

DATA PROCESSING DEVICE, DATA MANAGEMENT METHOD, STORAGE MEDIUM OF STORING COMPUTER-READABLE PROGRAM, AND PROGRAM

BACKGROUND OF THE INVENTION

1. Field of the Invention

The present invention relates to a data processing device which can process a predetermined job by communicating with another data processing device, a data management method which is applicable to the data processing device, a storage medium which stores a computer-readable program for achieving the data management method, and the program itself.

2. Related Background Art

As the hardware constitution in the data processing device, an encryption circuit is set directly on the bus connected to the hard disk. Consequently, in a case where the data are stored in the hard disk, all the data pass the encryption circuit. Thus, even if the software of the data processing device is upgraded, or even if the hard disk is stolen, the safety of the data is guaranteed. Moreover, as described in Japanese Patent Application Laid-Open No. 2004-139163, in the case where the CPU of the printing device encrypts the data and then stores the encrypted data in the hard disk, even if the hard disk is stolen, the safety of the data is likewise guaranteed.

As described above, if all the data stored in the hard disk are encrypted, it is possible to guarantee the safety of these data even if the hard disk is stolen. However, even in such a constitution, there is a fear that the safety of the data degrades if both the hard disk and the encryption circuit are stolen.

SUMMARY OF THE INVENTION

The present invention is completed in consideration of such a conventional problem as above, and an object thereof is to provide a data processing device comprising:
  a first storage unit adapted to store data;
  an encryption unit adapted to encrypt the data to be stored in the first storage unit;
  a decryption unit adapted to decrypt the encrypted data stored in the first storage unit;
  a second storage unit adapted to store location information representing a location in the first storage unit where data accessed in the first storage unit is stored;
  a third storage unit adapted to store data accessed in the first storage unit;
  a judgment unit adapted to judge whether or not the first storage unit is a predetermined device by comparing the data read from the location represented by the location information stored in the second storage unit with the data stored in the third storage unit; and
  a control unit adapted to permit use of the first storage unit in a case where it is judged by the judgment unit that the first storage unit is the predetermined device, and to limit the use of the first storage unit in a case where it is judged by the judgment unit that the first storage unit is not the predetermined device.

Another object of the present invention is to provide a data management method in a data processing device, comprising:
  an encryption step of encrypting data to be stored in a first storage unit;
  a decryption step of decrypting the encrypted data stored in the first storage unit;
  a location information storage step of storing, in a second storage unit, location information representing a location in the first storage unit where data accessed in the first storage unit is stored;
  a data storage step of storing, in a third storage unit, data accessed in the first storage unit;
  a judgment step of judging whether or not the first storage unit is a predetermined device by comparing the data read from the location represented by the location information stored in the second storage unit with the data stored in the third storage unit; and
  a job control step of permitting use of the first storage unit in a case where it is judged in the judgment step that the first storage unit is the predetermined device, and of limiting the use of the first storage unit in a case where it is judged in the judgment step that the first storage unit is not the predetermined device.

BRIEF DESCRIPTION OF THE DRAWINGS

FIG. 11 is a diagram for explaining the memory map of the storage medium which stores various data processing programs capable of being read by the data processing device according to the present invention.

DETAILED DESCRIPTION OF THE PREFERRED EMBODIMENTS

Hereinafter, the preferable embodiments of the present invention will be explained in detail with reference to the accompanying drawings.

First Embodiment

Explanation of System Constitution

Figure 1:
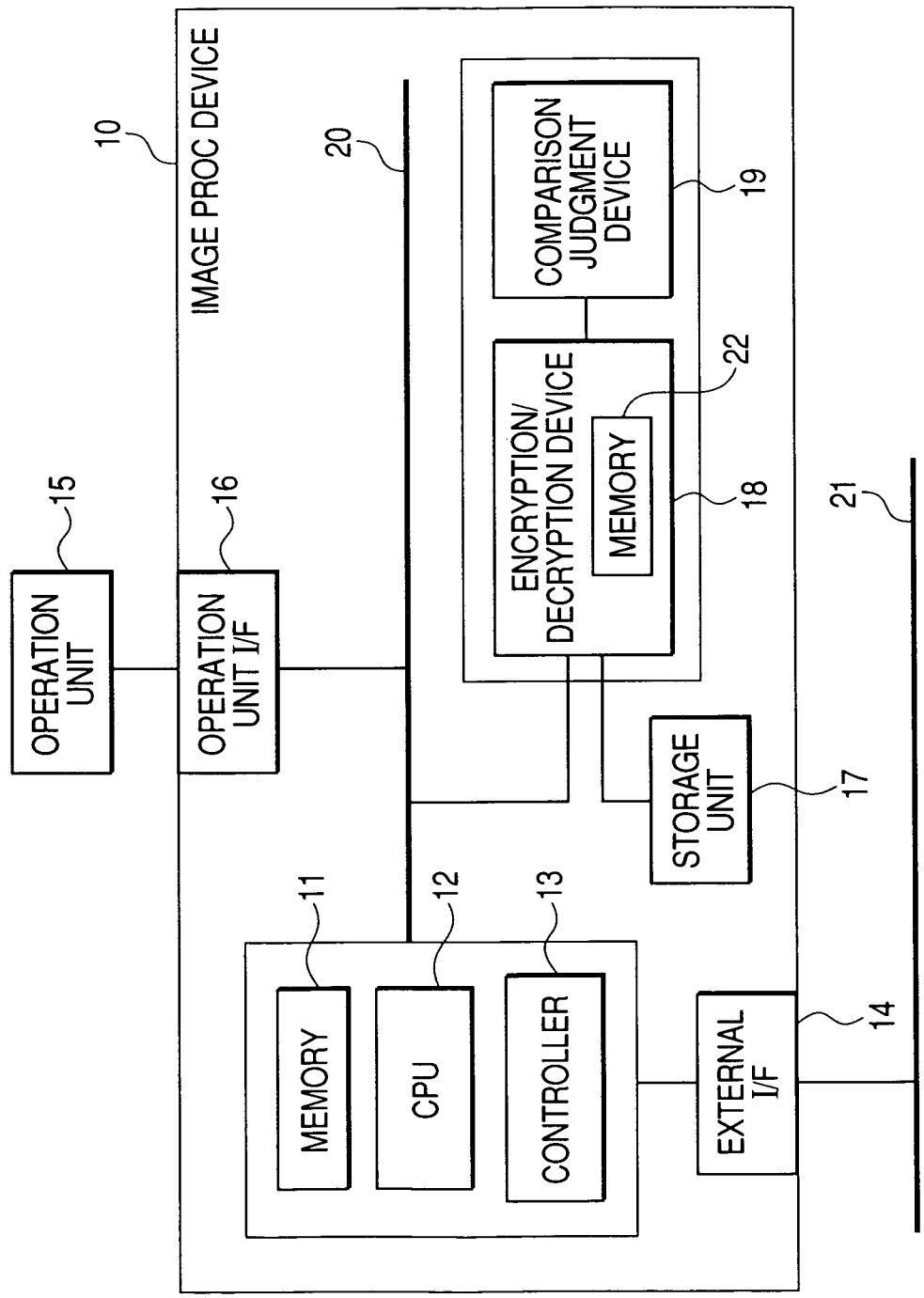
FIG. 1 is a block diagram for explaining the constitution of the data processing device according to the first embodiment of the present invention.

FIG. 1 is a block diagram for explaining the constitution of the data processing device according to the first embodiment of the present invention. That is, the data processing device according to the present embodiment can communicate with an information processing device through an external bus to be used for executing communication with external devices.

In FIG. 1, a data processing device 10 which consists of a printer unit and a scanner unit both not shown comprises the units of respectively executing a copy function, a print function, a scanner function and a facsimile communication function.

An operation unit 15 directly transfers a control job (that is, the control job using the copy function, the print function, the scanner function and the facsimile communication function) to the data processing device 10 through an operation unit I/F (interface) 16 according to an indication by an operator. Incidentally, in the present embodiment, it should be noted that a predetermined job in the control job includes the scanner job by the scanner unit and the print job by the printer unit. Moreover, it should be noted that the predetermined job includes any one of the copy jobs, the data reception job of receiving the data from an external device, and the data transmission job of transmitting the data to the external device, all executed by the scanner unit and the printer unit.

An external I/F 14 receives the print job from the information processing device such as a PC (personal computer) or the like communicable through an external bus 21. Moreover, the external I/F 14 notifies the driver of the information processing device of the state (status) information of the printer unit.

The data processing device 10 authenticates the user by comparing the authentication information stored in the data processing device 10 with the ID and the password input by the relevant user. Incidentally, the detail of the authentication process will be explained later.

A CPU 12 controls each function of the data processing device 10 according to the program stored in a memory 11. Here, the program necessary for controlling the data processing device 10, the various data, and the like are stored in the memory 11. A controller 13 transmits the data stored in a storage unit 17 such as a hard disk or the like to the external device through the external bus 21. Moreover, the controller 13 stores the first data transmitted through the external bus 21 in the storage unit 17.

In addition, the controller 13 transforms the data stored in the storage unit 17 and the first data transmitted through the external bus 21 into the second data. Then, the controller 13 stores the acquired second data in the storage unit 17 or transmits it to the external device.

The external I/F 14 receives the data transmitted from another device such as the information processing device or the like through the external bus 21, and then transfers the received data to the controller 13.

When the user handles the data processing device 10, the operation unit 15 is used to input the user ID and the password, select the process content intended to be executed by the data processing device 10, and transfer the information set by the user to the operation unit I/F 16. Here, the operation unit I/F 16 transfers the information input from the operation unit 15 to the controller 13 through an internal bus 20.

Incidentally, the data transmitted through the external bus 21 is encrypted by an encryption/decryption device 18 under the control of the controller 13, and the encrypted data is stored in the storage unit 17.

That is, the encryption/decryption device 18 executes the encryption of the data acquired through the external bus 21 and the information relative to the acquired data, on the basis of the predetermined encryption algorithm. Moreover, the encryption/decryption device 18 executes the decryption of the data encrypted based on the predetermined encryption algorithm. For example, in a case where the data stored in the storage unit 17 is transmitted to another device through the external bus 21, the encryption/decryption device 18 executes the decryption of the encrypted data stored in the storage unit 17 and the information relative to the encrypted data.

Moreover, the encryption/decryption device 18 comprises a memory 22 in which a part or all of the data transmitted at the last from the controller 13 is stored.

Here, it is assumed that in the present embodiment the encryption/decryption device 18 uses the RSA (Rivest Shamir Adleman) method as the predetermined encryption algorithm in case of executing the encryption and the decryption.

A comparison judgment device 19 judges whether or not the data acquired by decrypting the data in the storage unit 17 by the encryption/decryption device 18 conforms to the data held in the encryption/decryption device 18 by comparing them, and then transfers the judged result to the controller 13.

Incidentally, the internal bus 20 is used when each unit in the data processing device 10 transfers and receives the data, and the external bus 21 is used when all the devices connected to the data processing device 10 and the external bus 21 transmit and receive the data.

Figure 2:
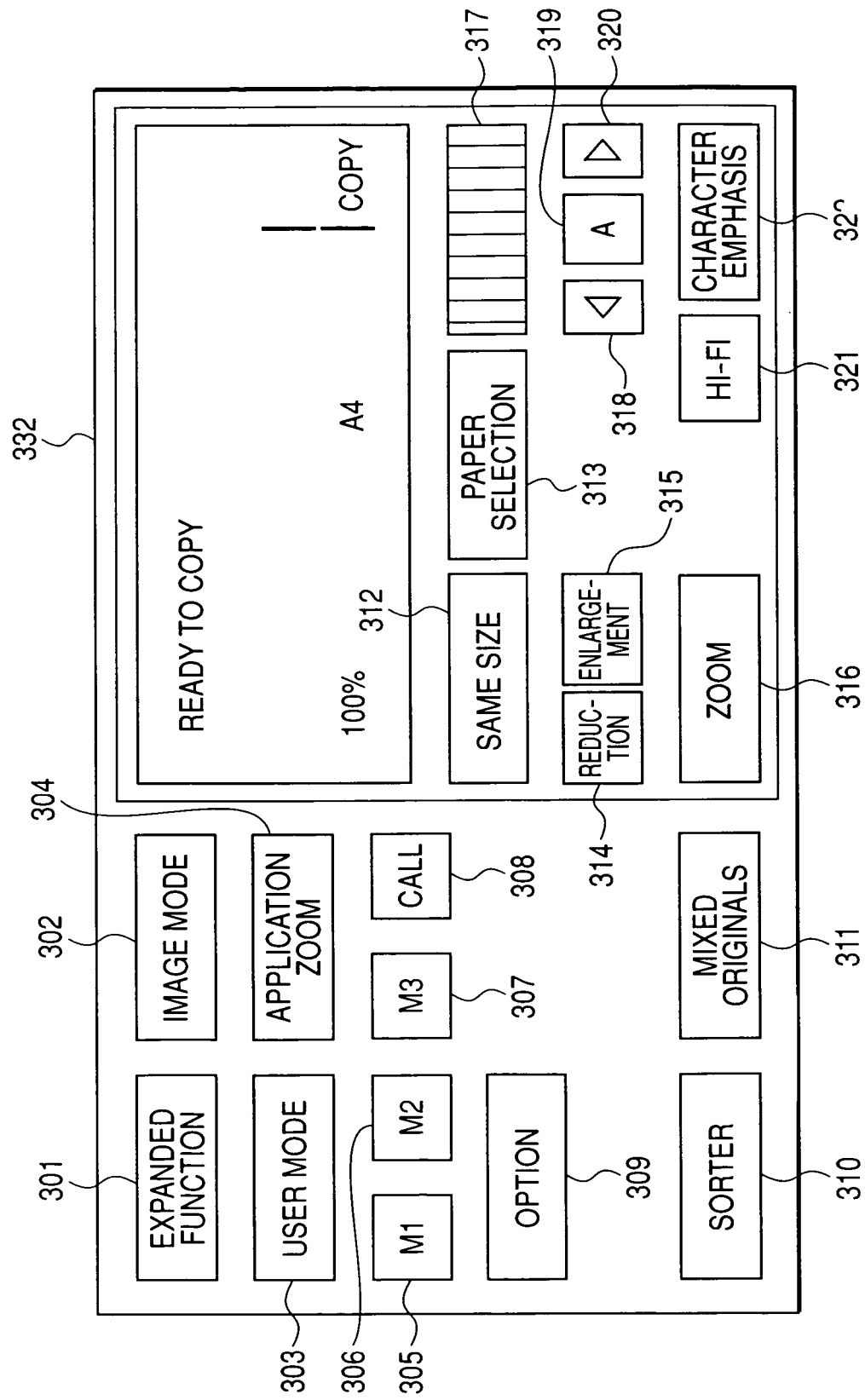
FIG. 2 is a plan view for explaining the configuration of the LCD unit of the operation unit shown in FIG. 1.

FIG. 2 is a plan view for explaining the configuration of the LCD unit provided on the operation unit 15 shown in FIG. 1.

In FIG. 2, the touch panel sheet is adhered onto an LCD unit 332 (FIG. 3) so as to display the operation screen of the system. In this connection, if the key displayed on the operation screen is touched or depressed, the location information representing the location of the relevant key is transferred to the CPU 12.

More specifically, an expanded function key 301 is the key which is depressed to enter into the mode of executing double-sided copying, multiple copying, shift, setting of binding margin, setting of frame cancellation, and the like.

An image mode key 302 is the key which is depressed to enter into the setting mode of setting screening, shadowing, trimming, and masking with respect to the copy image. A user mode key 306 is the key which is depressed to be able to execute registration of the mode memory, setting of the standard mode screen, setting of the management code and the like with respect to each user.

An application zoom key 304 is the key which is depressed to enter into the mode of zooming the X direction and the Y direction of the original independently and the zoom program mode of calculating the magnification based on the original size and the copy size. An M1 key 305 is the key which is depressed to call the mode memory corresponding to the M1 key 305, an M2 key 306 is the key which is depressed to call the mode memory corresponding to the M2 key 306, and an M3 key 307 is the key which is depressed to call the mode memory corresponding to the M3 key 307.

A call key 308 is the key which is depressed to call the previously set copy mode. An option key 309 is the key which is depressed to execute setting of the optional functions such as the film projector function of executing direct copying from a film, and the like. A sorter key 310 is the key which is depressed to execute setting of the modes such as the sort output mode, the group output mode, and the like.

A mixed originals key 311 is the key which is depressed when the A4 and A3 originals (or the B5 and B4 originals) are mixedly set on the original feeder. A same size key 312 is the key which is depressed to set the copy magnification to 100%, a reduction key 314 is the key which is depressed to execute the standard size reduction, and an enlargement key 315 is the key which is depressed to execute the standard size enlargement.

A zoom key 316 is the key which is depressed to execute the non-standard size reduction and enlargement in units of percent. A paper selection key 313 is the key which is depressed to select the copy paper, a density key 318 is the key which is depressed to gradually raise the copy density, and a density key 319 is the key which is depressed to gradually lower the copy density.

In a density display section 317, the displayed bar is moved rightward and leftward if the density keys are depressed properly. An AE (automatic exposure) key 319 is the key which is depressed to execute the automatic density adjustment copying for the original of which the substrate density is relatively high such as a newspaper. An HI-FI (high fidelity) key 321 is the key which is depressed to copy the original of which the halftone portions relatively stand out such as a photographic image. A character emphasis key 322 is the key which is depressed to emphasize the characters in case of copying the character (text) original.

Figure 3:
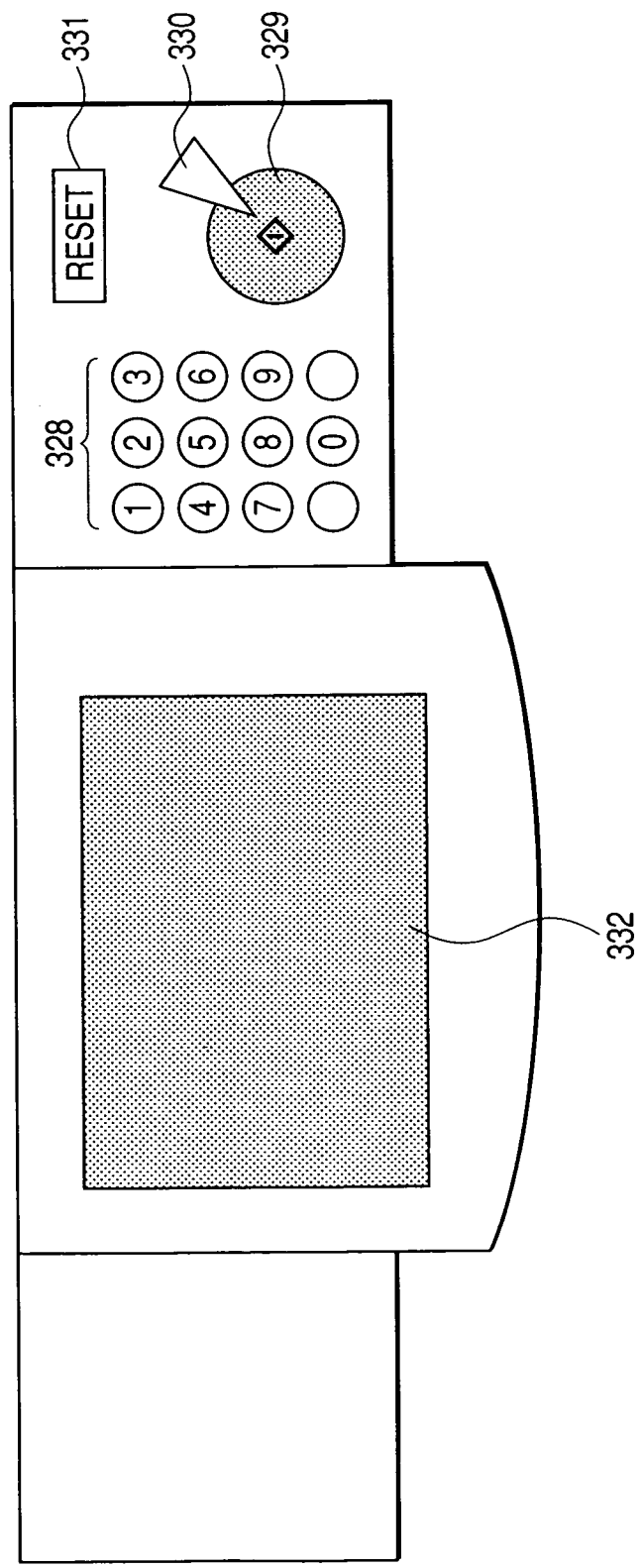
FIG. 3 is a plan view for explaining the configuration of the operation unit including the LCD unit shown in FIG. 2.

FIG. 3 is a plan view for explaining the configuration of the operation unit 15 which includes the LCD unit shown in FIG. 2.

In FIG. 3, numeral 330 denotes a stop key which is depressed to stop the operation, and numeral 331 denotes a reset key which is depressed to initialize the setting from the operation unit 15.

Numeral 328 denotes a numerical keyboard which is appropriately depressed to input the transmission contact addresses, the copy numbers, the authentication passwords and the like as numerical characters, and numeral 329 denotes a start key which is depressed to start the original image reading operation and the like.

Hereinafter, an example of the process that the data last written in the storage unit 17 is judged or discriminated by the controller 13 and the sector thereof is stored.

Figure 4:
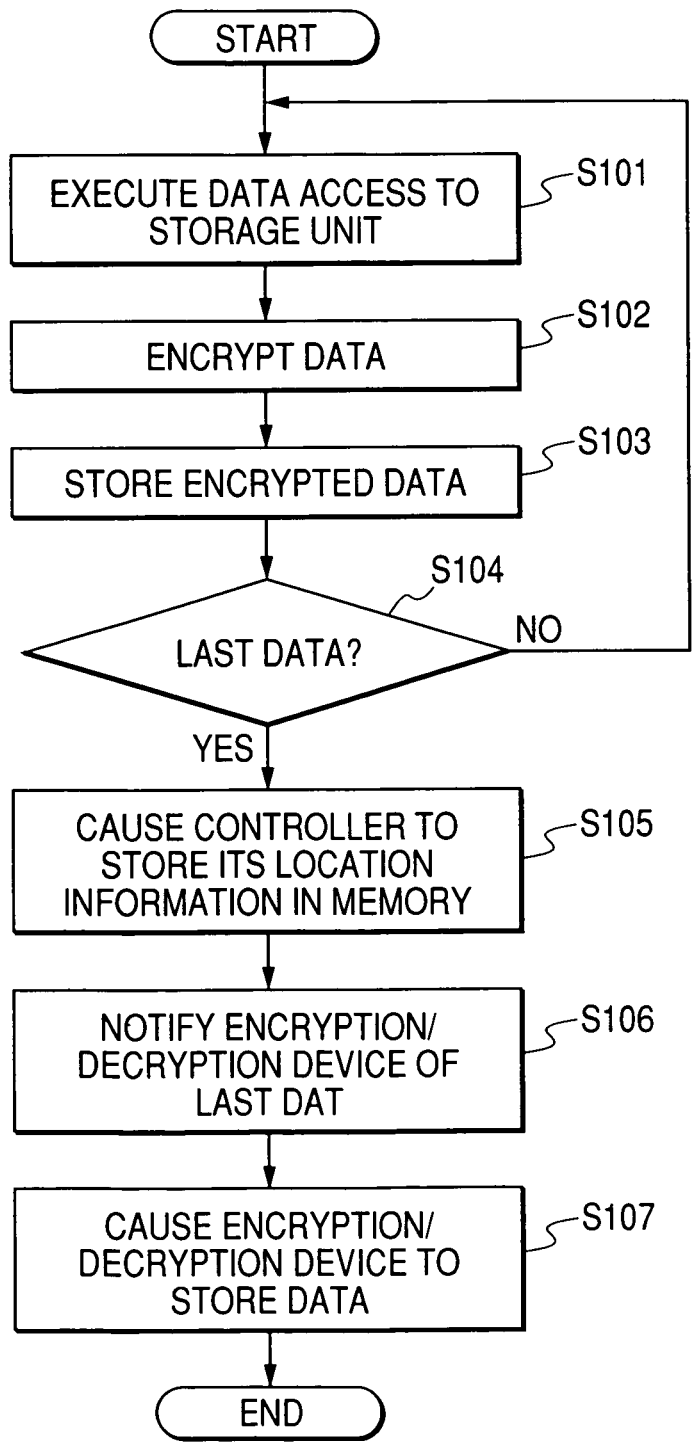
FIG. 4 is a flow chart showing an example of a first data processing procedure in the data processing device according to the present invention.

That is, FIG. 4 is the flow chart showing the example of a first data processing procedure in the data processing device according to the present invention. Incidentally, it should be noted that the first data processing procedure corresponds to the processing procedure that the data last written in the storage unit 17 is judged or discriminated by the controller 13 and the sector thereof is stored. Here, symbols S101, S102, S103, S104, S105, S106 and S107 denote the respective steps. Moreover, it should be noted that the CPU 12 executes the control program read from the memory 11 to appropriately control the controller 13, the encryption/decryption device 18, the comparison judgment device 19 and the storage unit 17, thereby achieving the first data processing procedure.

Initially, the controller 13 indicates data writing to the storage unit 17 (S101). Then, the encryption/decryption device 18 receives the data, encrypts the received data, and transmits the encrypted data to the storage unit 17 (S102). Subsequently, the storage unit 17 stores the encrypted data (S103).

At the same time, the controller 13 judges whether or not the data transferred to the storage unit 17 is the last data in the job (S104). If it is judged by the controller 13 that the data transferred to the storage unit 17 is not the last data in the job, the controller 13 continues to access the storage unit 17 as it is (S101).

Meanwhile, if it is judged by the controller 13 in the step S104 that the data transferred to the storage unit 17 is the last data in the job, the controller 13 holds in which sector of the storage unit 17 the last data is stored. More specifically, the controller 13 stores in the memory 11 the location information representing the sector where the last data is stored (S105). At that time, the controller 13 also notifies the encryption/decryption device 18 that the discriminated data is the last data of the control job (S106).

Then, the encryption/decryption device 18 stores in the memory 22 the data last received in the step S102 as the last accessed data (S107).

Incidentally, the encryption/decryption device 18 may store in the memory 22 the data last read from the storage unit 17 and decrypted, as the last accessed data.

Figure 5:
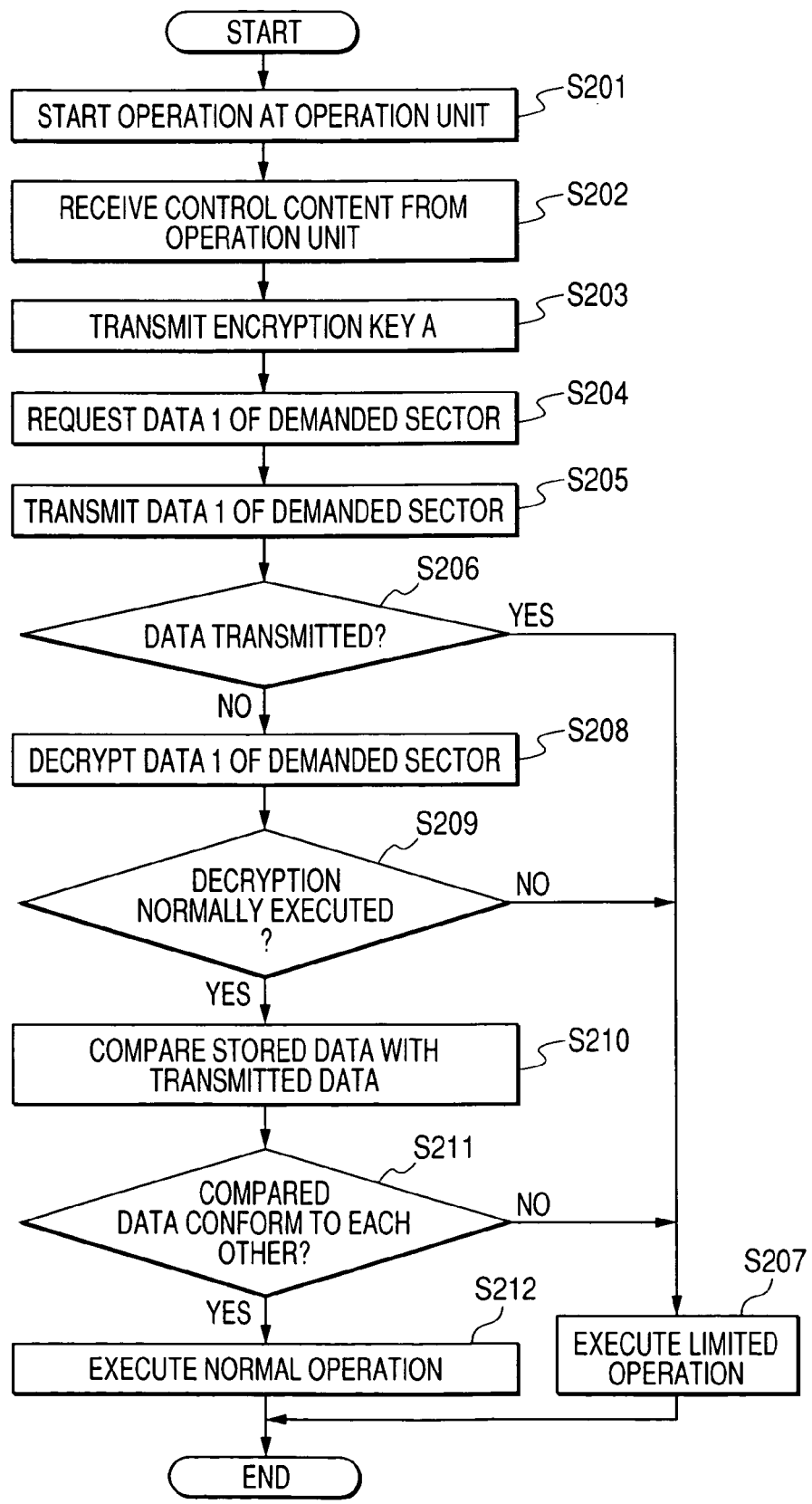
FIG. 5 is a flow chart showing an example of a second data processing procedure in the data processing device according to the present invention.

FIG. 5 is a flow chart showing an example of a second data processing procedure in the data processing device according to the present invention. Here, symbols S201, S202, S203, S204, S205, S206, S207, S208, S209, S210, S211 and S212 denote the respective steps. Moreover, it should be noted that the CPU 12 executes the control program read from the memory 11 to appropriately control the controller 13, the encryption/decryption device 18, the comparison judgment device 19 and the storage unit 17, thereby achieving the second data processing procedure.

Besides, in the present embodiment, it is assumed that the control job to the data processing device 10 is directly input by the user from the operation unit 15 of the data processing device 10, the algorithm to be used for the encryption is a predetermined algorithm, and the encryption key to be used for the encryption is provided in the controller 13 and the encryption/decryption device 18.

Moreover, the comparison judgment device 19 may compare a part of the relevant data. However, in the present embodiment, it is assumed that the comparison judgment device 19 compares the whole data.

Initially, the CPU 12 causes the operation unit 15 to display the operation screen (S201), and the user starts operating or handling the operation unit 15. Then, the CPU 12 receives the control job through the operation unit I/F 16 (S202). If the CPU 12 receives the control job, the controller 13 transfers the encryption key A uniquely provided by the data processing device 10 to the encryption/decryption device 18 through the internal bus 20 (S203). At that time, the controller 13 indicates the storage unit 17 to transfer the data of the sector last accessed in the storage unit 17 to the encryption/decryption device 18 (S204). More specifically, the controller 13 indicates the storage unit 17 to transfer the data of the sector represented by the location information stored in the memory 11 to the encryption/decryption device 18.

Next, under the control of the controller 13, the storage unit 17 transfers the data (data 1) of the demanded sector to the encryption/decryption device 18 (S205).

Here, the encryption/decryption device 18 judges or discriminates whether or not the data is transferred from the storage unit 17 (S206). If it is judged that the data is not transferred from the storage unit 17, the encryption/decryption device 18 judges that the storage unit 17 does not exist, and notifies the controller 13 of such a judged result. Besides, the controller 13 limits the execution of the job (S207). More specifically, the controller 13 permits the execution of the job not using the storage unit 17 but inhibits the execution of the job using the storage unit 17.

On the other hand, if it is judged by the encryption/decryption device 18 in the step S206 that the data is normally transferred from the storage unit 17, the encryption/decryption device 18 decrypts the transferred data (S208). Then, the encryption/decryption device 18 transfers the decrypted data and the data previously stored in the memory to the comparison judgment device 19 (S208).

Subsequently, the comparison judgment device 19 judges whether or not the decryption is normally executed (S209). If it is judged that the decryption is not normally executed, the encryption/decryption device 18 judges that abnormality occurs, and notifies the controller 13 of such a judged result. Besides, the controller 13 limits the execution of the job (S207).

On the other hand, if it is judged in the step S209 that the decryption is normally executed, the comparison judgment device 19 compares the data previously stored in the memory 22 in the step S107 with the data decrypted by the encryption/decryption device 18 in the step S208 (S210). Then, the comparison judgment device 19 transfers the comparison result to the controller 13 (S210).

If the comparison result is received from the comparison judgment device 19, the controller 13 judges whether the comparison result is indicative of conformity or nonconformity (S211). If it is judged by the controller 13 that the comparison result is indicative of nonconformity, the controller 13 judges or discriminates that abnormality occurs in any device or the system constitution is in an abnormal combination state. Thus, the controller 13 limits the execution of the job (S207). On the other hand, if it is judged by the controller 13 that the comparison result is indicative of conformity, the controller 13 judges or discriminates that the system constitution is in a normal combination state. Thus, the controller 13 normally executes the job (S212).

Hereinafter, an example of the decryption process shown in FIG. 4 will be explained with reference to FIG. 6.

Figure 6:
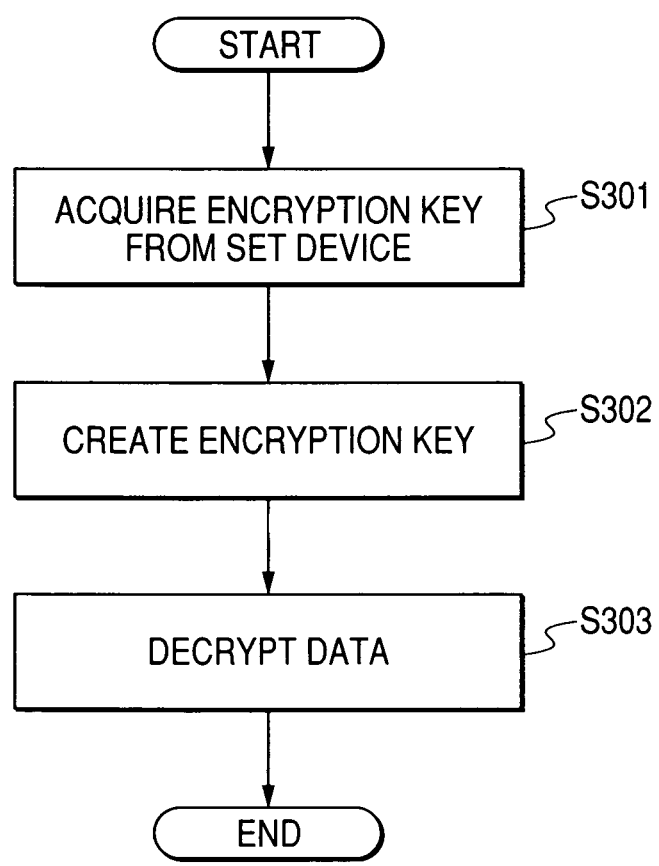
FIG. 6 is a flow chart showing an example of a third data processing procedure in the data processing device according to the present invention.

FIG. 6 is the flow chart showing the example of a third data processing procedure in the data-processing device according to the present invention. Incidentally, it should be noted that the third data processing procedure corresponds to the detailed procedure of the decryption process in the step S208 shown in FIG. 5. Here, symbols S301, S302 and S303 denote the respective steps.

Initially, in case of decrypting the data, the encryption/decryption device 18 acquires the encryption key A from the controller 13 (S301). Then, the encryption/decryption device 18 creates the encryption key C from the acquired encryption key A and the encryption key B provided in the encryption/decryption device 18 itself (S302).

Subsequently, the encryption/decryption device 18 decrypts the data transferred from the storage unit 17, based on the created encryption key C (S303).

Thus, it is possible to detect that the storage unit 17 or/and the encryption/decryption device 18 is/are removed, and it is also possible to detect that the controller 13 is exchanged. Moreover, when the abnormality is detected, the processing operation is changed, whereby it is possible to prevent a change of the combination of the devices, and it is also possible to guarantee the safety of the data stored in the storage unit.

Second Embodiment

Explanation of System Constitution

Figure 7:
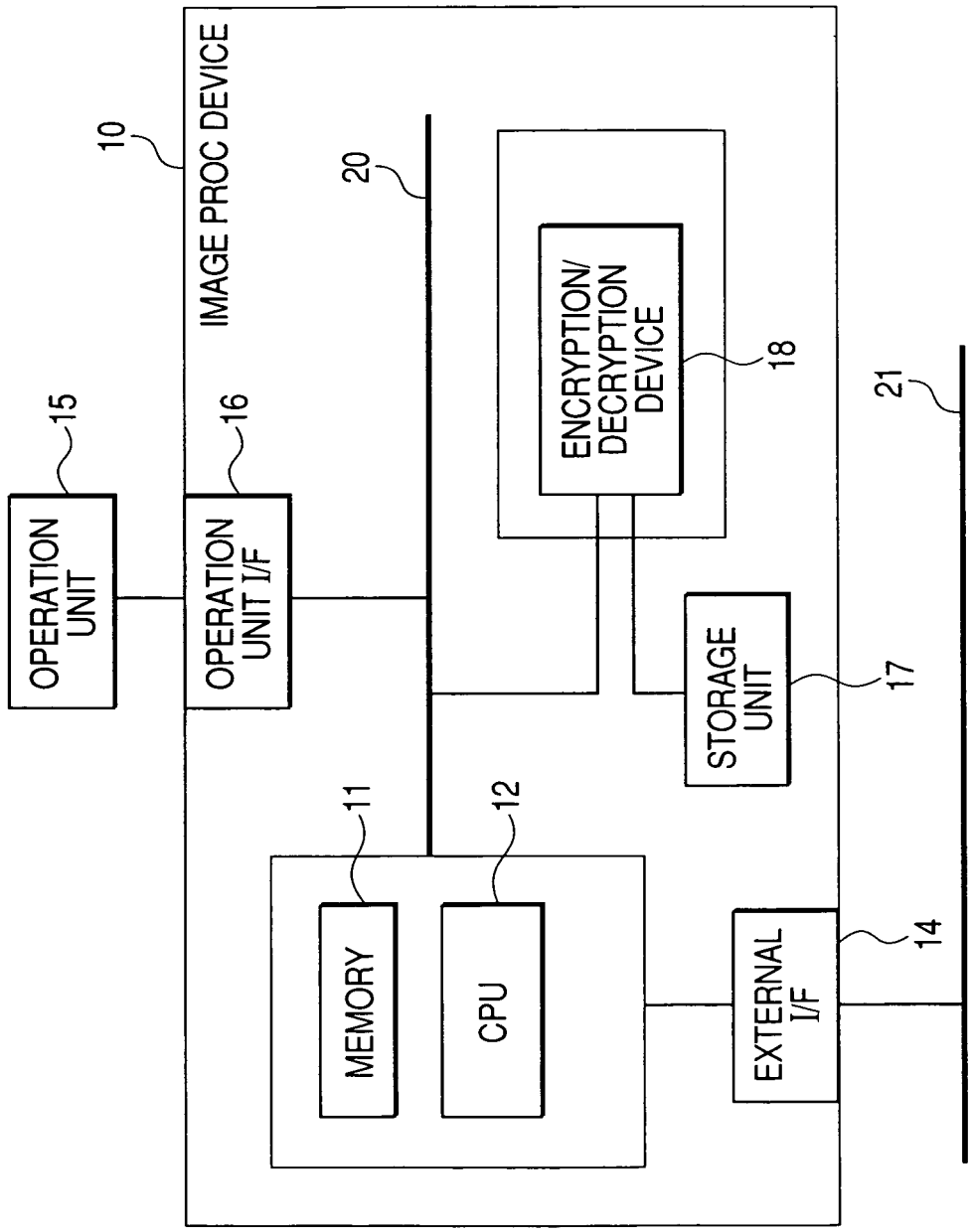
FIG. 7 is a block diagram for explaining the constitution of the data processing device according to the second embodiment of the present invention.

FIG. 7 is a block diagram for explaining the constitution of the data processing device according to the second embodiment of the present invention. That is, it should be noted that, in the second embodiment, a CPU 12 executes the processes which are executed respectively by the controller 13 and the comparison judgment device 19 in the first embodiment (FIG. 1).

In FIG. 7, a data processing device 10 which consists of a printer unit and a scanner unit both not shown comprises the units of respectively executing the copy function, the print function, the scanner function and the facsimile communication unction.

An operation unit 15 directly transfers a control job (that is, the control job using the copy function, the print function, the scanner function and the facsimile communication function) to the data processing device 10 through an operation unit I/F 16 according to the indication by the operator. Incidentally, in the present embodiment, it should be noted that the predetermined job in the control job includes the scanner job by the scanner unit and the print job by the printer unit. Moreover, it should be noted that the predetermined job includes any one of the copy jobs, the data reception job of receiving the data from an external device, and the data transmission job of transmitting the data to the external device, all executed by the scanner unit and the printer unit.

An external I/F 14 receives the print job from the information processing device such as the PC or the like communicable through an external bus 21. Moreover, the external I/F 14 notifies the driver of the information processing device of the state (status) information of the printer unit.

The data processing device 10 authenticates the user by comparing the authentication information stored in the data processing device 10 with the ID and the password input by the relevant user. Incidentally, the detail of the authentication process will be explained later.

The CPU 12 controls each function of the data processing device 10 according to the program stored in a memory 11. Here, the program necessary for controlling the data processing device 10, the various data, and the like are stored in the memory 11. Moreover, the CPU 12 transmits the data stored in a storage unit 17 such as a hard disk or the like to the external device through the external bus 21. Moreover, the CPU 12 stores the first data transmitted through the external bus 21 in the storage unit 17.

In addition, the CPU 12 transforms the data stored in the storage unit 17 and the first data transmitted through the external bus 21 into the second data. Then, the CPU 12 stores the acquired second data in the storage unit 17 or transmits it to the external device through the external bus 21.

The external I/F 14 receives the data transmitted from another device such as the information processing device or the like through the external bus 21, and then transfers the received data to the CPU 12.

When the user handles the data processing device 10, the operation unit 15 is used to input the user ID and the password, select the process content intended to be executed by the data processing device 10, and transfer the information set by the user to the operation unit I/F 16. Here, the operation unit I/F 16 transfers the information input from the operation unit 15 to the CPU 12 through an internal bus 20.

Incidentally, the data transmitted through the external bus 21 is encrypted by an encryption/decryption device 18 under the control of the CPU 12, and the encrypted data is stored in the storage unit 17.

That is, the encryption/decryption device 18 executes the encryption of the data acquired through the external bus 21 and the information relative to the acquired data, on the basis of the predetermined encryption algorithm. Moreover, the encryption/decryption device 18 executes the decryption of the data encrypted based on the predetermined encryption algorithm. For example, in the case where the data stored in the storage unit 17 is transmitted to another device through the external bus 21, the encryption/decryption device 18 executes the decryption of the encrypted data stored in the storage unit 17 and the information relative to the encrypted data.

Here, it is assumed that in the present embodiment the encryption/decryption device 18 uses the RSA method as the predetermined encryption algorithm in case of executing the encryption and the decryption.

Incidentally, the internal bus 20 is used when each unit in the data processing device 10 transfers and receives the data, and the external bus 21 is used when all the devices connected to the data processing device 10 and the external bus 21 transmit and receive the data.

Figure 8:
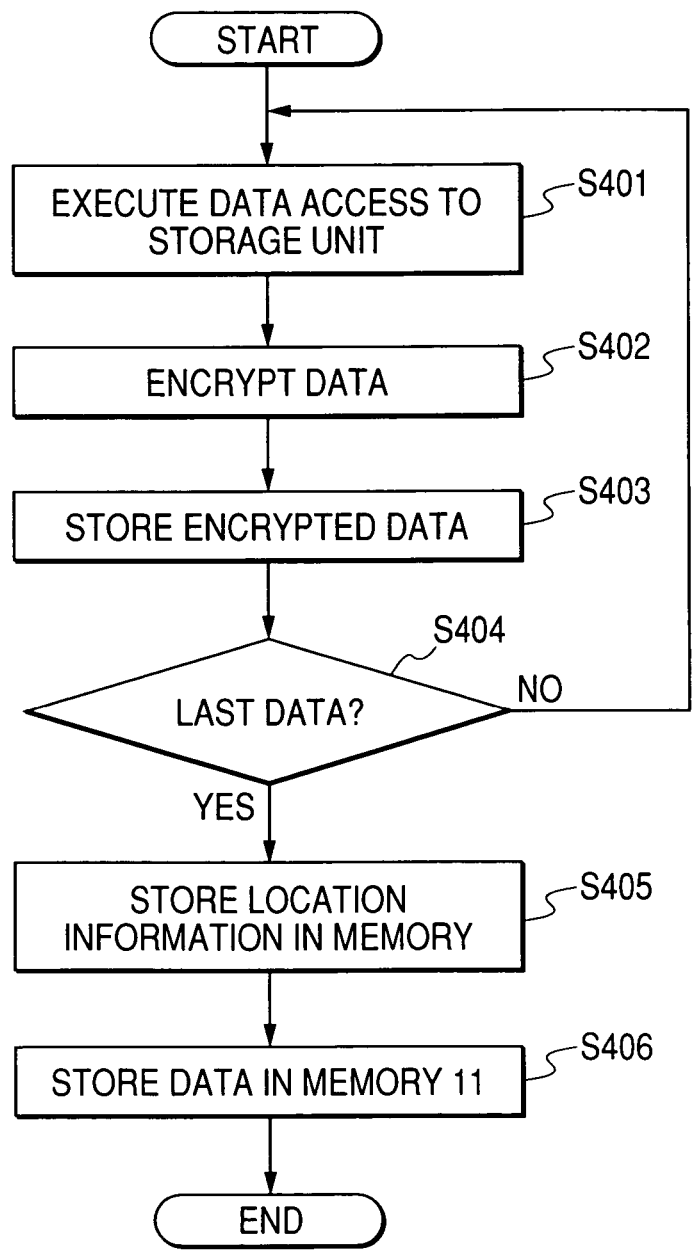
FIG. 8 is a flow chart showing an example of a fourth data processing procedure in the data processing device according to the present invention.

FIG. 8 is a flow chart showing an example of a fourth data processing procedure in the data processing device according to the present invention. Incidentally, it should be noted that the fourth data processing procedure corresponds to the processing procedure that the data last written in the storage unit 17 is judged or discriminated by the CPU 12 and the sector thereof is stored. Here, symbols S401, S402, S403, S404, S405 and S406 denote the respective steps. Moreover, it should be noted that the CPU 12 executes the control program read from the memory 11, thereby achieving the fourth data processing procedure.

Initially, the CPU 12 indicates data writing to the storage unit 17 (S401). At that time, the CPU 12 controls the encryption/decryption device 18 encrypts the data, and transmits the encrypted data to the storage unit 17 (S402). Subsequently, the CPU 12 controls the storage unit 17 to store the encrypted data (S403).

Moreover, the CPU 12 judges whether or not the data transferred to the storage unit 17 is the last data in the job (S404). If it is judged by the CPU 12 that the data transferred to the storage unit 17 is not the last data in the job, the CPU 12 continues to access the storage unit 17 as it is (S401).

Meanwhile, if it is judged by the CPU 12 in the step S404 that the data transferred to the storage unit 17 is the last data in the job, the CPU 12 holds in the memory 11 the location information representing the sector where the last data is stored (S405).

Then, the CPU 12 stores in the memory 11 the data to which the writing is last indicated, as the last accessed data (S406). Incidentally, the CPU 12 may store in the memory 11 the data last read from the storage unit 17 and decrypted, as the last accessed data.

Figure 9:
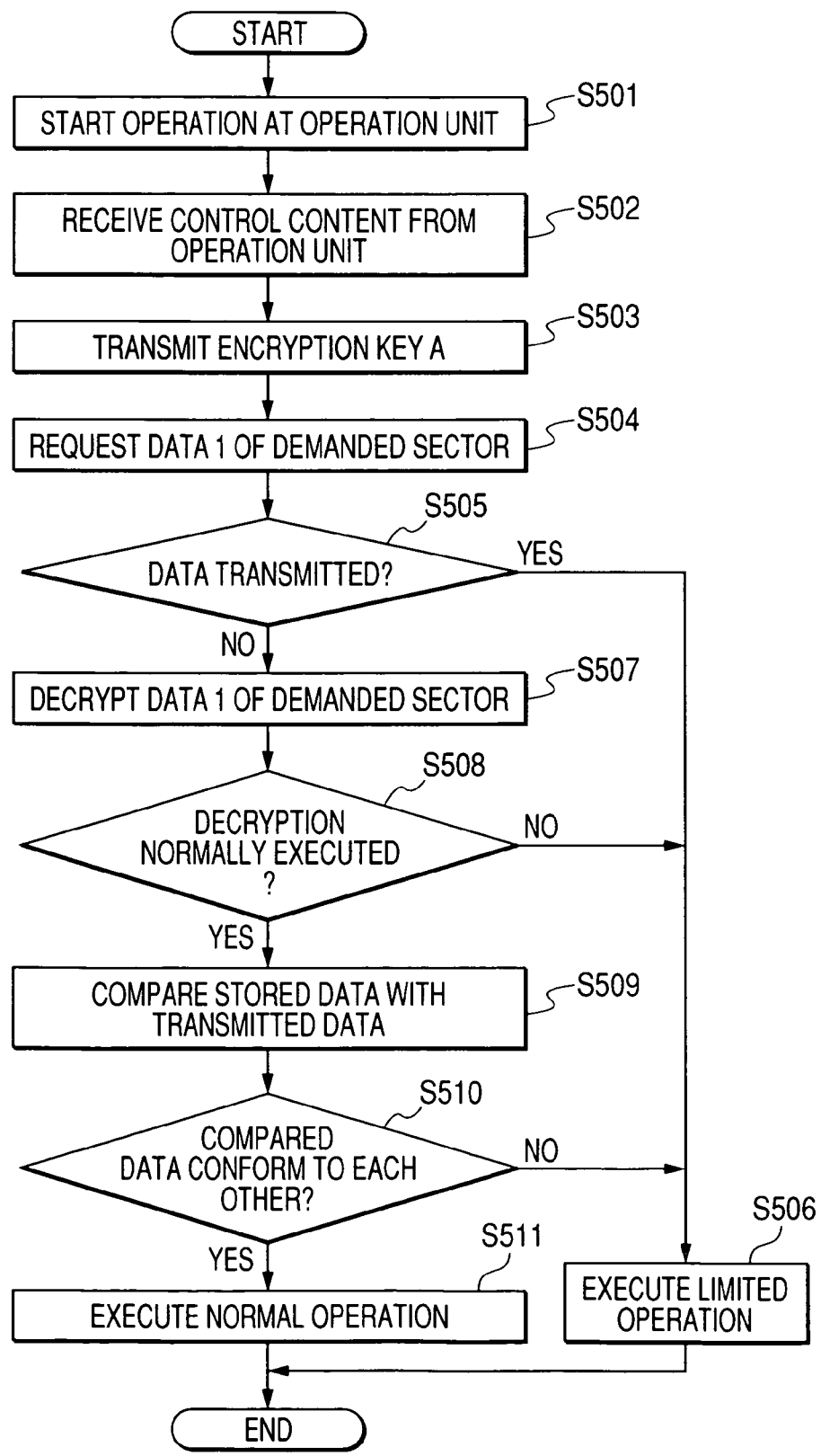
FIG. 9 is a flow chart showing an example of a fifth data processing procedure in the data processing device according to the present invention.

FIG. 9 is a flow chart showing an example of a second data processing procedure in the data processing device according to the present invention. Here, symbols S501, S502, S503, S504, S505, S506, S507, S508, S509, S510 and S511 denote the respective steps.

Besides, in the present embodiment, it is assumed that the control job to the data processing device 10 is directly input by the user from the operation unit 15 of the data processing device 10, the algorithm to be used for the encryption is a predetermined algorithm, and the encryption key to be used for the encryption is provided in the CPU 12 and the encryption/decryption device 18.

Initially, the CPU 12 causes the operation unit 15 to display the operation screen (S501), and the user starts operating or handling the operation unit 15. Then, the CPU 12 receives the control job through the operation unit I/F 16 (S502). If the CPU 12 receives the control job, the CPU 12 transfers the encryption key A uniquely provided by the data processing device 10 and stored in the memory 11 to the encryption/decryption device 18 through the internal bus 20 (S503). At that time, the CPU 12 indicates the storage unit 17 to transfer the data of the sector last accessed in the storage unit 17 to the encryption/decryption device 18 (S504). More specifically, the CPU 12 indicates the storage unit 17 to transfer the data of the sector represented by the location information stored in the memory 11 to the encryption/decryption device 18. Next, under the control of the CPU 12, the storage unit 17 transfers the data (data 1) of the demanded sector to the encryption/decryption device 18.

Subsequently, the CPU 12 indicates the encryption/decryption device 18 to judge or discriminate whether or not the data is transferred from the storage unit 17 (S505). If it is judged that the data is not transferred from the storage unit 17, the encryption/decryption device 18 judges that the storage unit 17 does not exist, and notifies the CPU 12 of such a judged result. Besides, the CPU 12 limits the execution of the job (S506). More specifically, the CPU 12 permits the execution of the job not using the storage unit 17 but inhibits the execution of the job using the storage unit 17.

On the other hand, if the data is normally transferred from the storage unit 17, the encryption/decryption device 18 notifies the CPU 12 of such a fact. In the meantime, the CPU 12 controls the encryption/decryption device 18 to transfer the decrypted data and the data previously stored in the memory to the CPU 12 (S507).

Then, the CPU 12 judges whether or not the decryption is normally executed (S508). If it is judged that the decryption is not normally executed, the CPU 12 limits the execution of the job (S506).

On the other hand, if it is judged in the step S508 that the decryption is normally executed, the CPU 12 compares the data previously stored in the memory 11 in the step S406 with the data decrypted by the encryption/decryption device 18 in the step S507 (S509).

Then, the CPU 12 judges whether the comparison result is indicative of conformity or nonconformity (S510). If it is judged by the CPU 12 that the comparison result is indicative of nonconformity, the CPU 12 judges or discriminates that abnormality occurs in any device or the system constitution is in an abnormal combination state. Thus, the CPU 12 limits the execution of the job (S506). On the other hand, if it is judged by the CPU 12 that the comparison result is indicative of conformity, the CPU 12 judges or discriminates that the system constitution is in a normal combination state. Thus, the CPU 12 normally executes the job (S511).

Hereinafter, an example of the decryption process shown in FIG. 9 will be explained with reference to FIG. 10.

Figure 10:
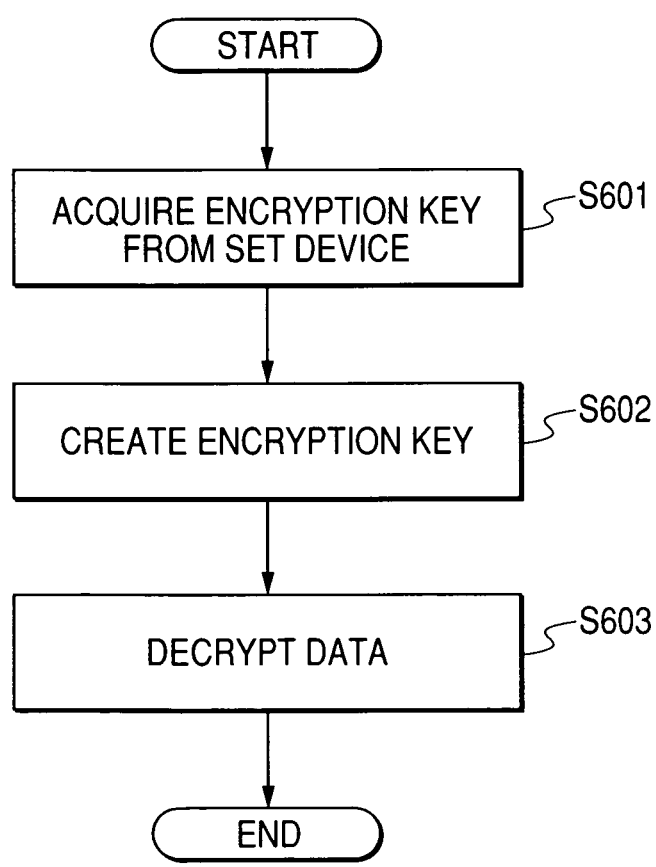
FIG. 10 is a flow chart showing an example of a sixth data processing procedure in the data processing device according to the present invention.

FIG. 10 is the flow chart showing the example of a sixth data processing procedure in the data processing device according to the present invention.

Incidentally, it should be noted that the sixth data processing procedure corresponds to the detailed procedure of the decryption process in the step S507 shown in FIG. 9. Here, symbols S601, S602 and S603 denote the respective steps.

Initially, in case of decrypting the data, the encryption/decryption device 18 acquires the encryption key A from the CPU 12 (S601). Then, the encryption/decryption device 18 creates the encryption key C from the acquired encryption key A and the encryption key B provided in the encryption/decryption device 18 itself (S602).

Subsequently, the encryption/decryption device 18 decrypts the data transferred from the storage unit 17, based on the created encryption key C (S303). After then, the encryption/decryption device 18 transfers the decrypted data to the CPU 12 (S603).

Third Embodiment

Hereinafter, the construction of the data processing program capable of being read by the device according to the present invention will be explained with reference to a memory map shown in FIG. 11.

FIG. 11 is the diagram for explaining the memory map of the storage medium which stores the various data processing programs capable of being read by the data processing device according to the present invention.

Although it is not specifically shown in the drawings, the information for managing the program group to be stored in the storage medium, for example, the version information and the information in which the creator or the like is stored and depending on the OS or the like at the side of reading out the programs, for example, the icon or the like for discriminatingly displaying programs are also sometimes stored.

Further, the data subordinate to the various programs is managed by the above directory. In a case that the program used for installing the various programs into the computer or the program to be installed is compressed, the program used for extraction or decompression is also sometimes stored.

The functions shown in FIGS. 4 to 5 or FIGS. 8 to 9 in the embodiments may be executed by the host computer according to the programs installed from the external devices. In that case, the present invention is applicable in a case that the information group including the programs is supplied to the output device by the storage medium such as a CD-ROM, a flash memory, an FD (Floppy™ disk) or the like, or from the external storage medium through the network.

As above, it is needless to say that the object of the present invention can be achieved in a case where the storage medium recording the program codes of software for realizing the functions of the above embodiments is supplied to a system or an apparatus and then a computer (or CPU or MPU) in the system or the apparatus reads and executes the program codes stored in the storage medium.

In that case, the program codes themselves read from the storage medium realize the new functions of the present invention, whereby the storage medium storing such the program codes constitutes the present invention.

Therefore, any form of the program, such as an object code, a program executed by the interpreter, script data or the like to be supplied to the OS is available without inquiring a program form if having the function of a program.

As the storage medium for supplying the programs, for example, a flexible disk, a hard disk, an optical disk, a magnetooptical disk, an MO, a CD-ROM, a CD-R, a CD-RW, a magnetic tape, a nonvolatile memory card, a ROM, a DVD or the like can be used.

In that case, the program codes themselves read from the storage medium realize the functions of the above embodiments, and the storage medium storing such the program codes constitutes the present invention.

As another method of supplying the programs, which can be also supplied by downloading the computer program itself of the present invention or the file which is compressed and includes the automatic installing function into the storage medium such as the hard disk or the like from the homepage by connecting to the homepage on the Internet by using the browser of the client computer. Further, the supplying of the programs can be also realized by dividing the program codes constituting the program of the present invention into the plural files and downloading the respective files from different homepages. That is, a WWW server, an ftp (file transfer protocol) server or the like, which makes the plural users to download the program files for realizing the functional processes of the present invention by the computer, is also included in appended claims of the present invention.

The programs of the present invention which are encrypted and stored in the storage media such as the CD-ROM or the like are distributed to the users, and the key information for solving the encoded programs is made to be downloaded for the specific user who clears the predetermined condition from the homepage through the Internet, and that user executes the encoded programs by using the key information to install the programs into the computer. Thus, the supplying of the programs can be also realized.

It is needless to say that the present invention also includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention includes a case where the program codes read from the storage medium are once written in the memory provided in a function expansion board inserted in the computer or a function expansion unit connected to the computer, then the CPU or the like provided in the function expansion board or the function expansion unit executes all the process or a part thereof according to the instructions of the program codes, thereby realizing the functions of the above embodiments.

The present invention is not limited to the above embodiments, but can be modified in various manners (including an organic combination of embodiments) on the basis of the spirit of the present invention, and the various modifications are not excluded from the scope of the present invention.

This application claims priority from Japanese Patent Application No. 2004-285994 filed Sep. 30, 2004, which is hereby incorporated by reference herein.

What is claimed is:

1. A data processing device for executing data processing, the data processing device comprising:
a first storage unit configured to store data;
an encryption unit configured to encrypt the data to be stored in said first storage unit;
a decryption unit configured to decrypt the encrypted data stored in said first storage unit;
a second storage unit configured to store data after decrypting data last read from said first storage unit in executing the data processing or before encrypting data last written to said first storage unit in executing the data processing;
a third storage unit configured to store location information representing a location of the data last read from said first storage unit or last written to said first storage unit;
a judgment unit configured to compare data, which is read from the location represented by the location information stored in said third storage unit and is decrypted by said decryption unit, with the data stored in said second storage unit; and
a control unit configured to enable the data processing to use said first storage unit in a case where the data, which is read from the location represented by the location information stored in the third storage unit and is decrypted, corresponds to the data stored in said second storage unit, and to limit execution of the data processing using said first storage unit in a case where the data, which is read from the location represented by the location information stored in the third storage unit and is decrypted, does not correspond to the data stored in said second storage unit,
wherein in a first data processing, the data last read from a first position in said first storage unit or last written to the first position in said first storage unit is used for comparison, and in a second data processing, the data last read from a second position in said first storage unit or last written to the second position in said first storage unit is used for comparison, so that the data used for comparison changes according to the data accessed in said first storage unit.

2. A data processing device according to claim 1, wherein the data accessed in said first storage unit is either data capable of being stored in units of memory of said first storage unit or partial data of said data capable of being stored in units of memory of said first storage unit.

3. A data processing device according to claim 1, further comprising a key creation unit configured to create a key for decrypting the data from a key provided in said control unit and a key provided in said decryption unit.

4. A data processing device according to claim 1, wherein said third storage unit is provided in any one of plural devices included in said data processing device.

5. A data processing device according to claim 1, wherein the data processing is a scanner job by a scanner, a print job by a printer, a copy job by the scanner and the printer, a data reception job of receiving data from an external device, or a data transmission job of transmitting data to the external device.

6. A data management method for a data processing device for executing data processing, the method comprising:
    an encryption step of encrypting data to be stored in a first storage unit;
    a decryption step of decrypting the encrypted data stored in the first storage unit;
    a data storage step of storing, in a second storage unit, data after decrypting data last read from the first storage unit in executing the data processing or before encrypting data last written to the first storage unit in executing the data processing;
    a location information storage step of storing, in a third storage unit, location information representing a location of the data last read from the first storage unit or last written to the first storage unit;
    a judgment step of comparing the data, which is read from the location represented by the location information stored in the third storage unit and is decrypted, with the data stored in the second storage unit; and
    a control step of enabling the data processing to use the first storage unit in a case where the data, which is read from the location represented by the location information stored in the third storage unit and is decrypted, corresponds to the data stored in the second storage unit, and limiting execution of the data processing using the first storage unit in a case where the data, which is read from the location represented by the location information stored in the third storage unit and is decrypted, does not correspond to the data stored in the second storage unit,
    wherein in a first data processing, the data last read from a first position in said first storage unit or last written to the first position in said first storage unit is used for comparison, and in a second data processing, the data last read from a second position in said first storage unit or last written to the second position in said first storage unit is used for comparison, so that the data used for comparison changes according to the data accessed in said first storage unit.

7. A non-transitory computer-readable storage medium storing a computer program executable by a data processing device for executing data processing to carry out a data management method, said method comprising:
    an encryption step of encrypting data to be stored in a first storage unit;
    a decryption step of decrypting the encrypted data stored in the first storage unit;
    a data storage step of storing, in a second storage unit, data after decrypting data last read from the first storage unit in executing the data processing or before encrypting data last written to the first storage unit in executing the data processing;
    a location information storage step of storing, in a third storage unit, location information representing a location of the data last read from the first storage unit or last written to the first storage unit;
    a judgment step of comparing the data, which is read from the location represented by the location information stored in the third storage unit and is decrypted, with the data stored in the second storage unit; and
    a control step of enabling the data processing to use the first storage unit in a case where the data, which is read from the location represented by the location information stored in the third storage unit and is decrypted, corresponds to the data stored in the second storage unit, and limiting execution of the data processing using the first storage unit in a case where the data, which is read from the location represented by the location information stored in the third storage unit and is decrypted, does not correspond to the data stored in the second storage unit,
    wherein in a first data processing, the data last read from a first position in said first storage unit or last written to the first position in said first storage unit is used for comparison, and in a second data processing, the data last read from a second position in said first storage unit or last written to the second position in said first storage unit is used for comparison, so that the data used for comparison changes according to the data accessed in said first storage unit.

\* \* \* \* \*